United States Patent [19]
De'ath

[11] Patent Number: 6,071,463
[45] Date of Patent: Jun. 6, 2000

[54] METHOD AND APPARATUS FOR PREVENTING SINK MARKS IN THE INJECTION MOULDING OF THERMOPLASTIC POLYMERS

[75] Inventor: Roderick Michael De'ath, Oxon, United Kingdom

[73] Assignee: Kontor Moulding Systems Limited, Oxon, United Kingdom

[21] Appl. No.: 08/178,263
[22] PCT Filed: Jul. 3, 1992
[86] PCT No.: PCT/GB92/01206
§ 371 Date: Jan. 3, 1994
§ 102(e) Date: Jan. 18, 1994
[87] PCT Pub. No.: WO93/01039
PCT Pub. Date: Jan. 21, 1993

[30] Foreign Application Priority Data

Jul. 3, 1991 [GB] United Kingdom ............ 9114324

[51] Int. Cl.⁷ .......................................... B29C 45/17
[52] U.S. Cl. ............. 264/328.16; 264/335; 425/552; 425/387.1
[58] Field of Search ................ 264/328.16, 572, 264/500, 328.1, 328.8, 328.12, 335; 425/533, 552, 556, 387.1, 405.1, 437

[56] References Cited

U.S. PATENT DOCUMENTS

| | | |
|---|---|---|
| 4,101,617 | 7/1978 | Friederick . |
| 4,164,523 | 8/1979 | Hanning ........................ 264/328.16 |
| 4,177,238 | 12/1979 | Allen ............................. 264/328.16 |
| 4,474,717 | 10/1984 | Hendry . |
| 4,740,150 | 4/1988 | Sayer . |
| 4,824,732 | 4/1989 | Hendry et al. . |
| 4,913,644 | 4/1990 | Kauer . |
| 4,923,666 | 5/1990 | Yamazaki et al. . |
| 4,923,667 | 5/1990 | Sayer . |
| 4,944,910 | 7/1990 | Hendry . |
| 5,028,377 | 7/1991 | Hendry . |
| 5,069,858 | 12/1991 | Hendry . |
| 5,069,859 | 12/1991 | Loren . |
| 5,098,637 | 3/1992 | Hendry . |
| 5,110,533 | 5/1992 | Hendry . |
| 5,137,680 | 8/1992 | Hendry . |
| 5,225,141 | 7/1993 | Hendry . |
| 5,232,711 | 8/1993 | Hendry . |

FOREIGN PATENT DOCUMENTS

| | | |
|---|---|---|
| 0 250 080 | 12/1987 | European Pat. Off. . |
| 2 139 549 | 11/1984 | United Kingdom . |
| 2 158 002 | 11/1985 | United Kingdom . |
| 2 217 644 | 11/1989 | United Kingdom . |
| 2 241 464 | 9/1991 | United Kingdom . |

*Primary Examiner*—Jill L. Heitbrink
*Attorney, Agent, or Firm*—Nixon & Vanderhye P.C.

[57] ABSTRACT

A method and apparatus for injection moulding thermoplastic polymers wherein a layer of pressurised gas is provided between at least selected moulded parts (11) and the cooling polymer (28). The gas takes up shrinkage as the polymer cools and allows visual sink marks to be substantially eliminated. Furthermore, cycle times are reduced, fast cooling being permitted by urging the polymer (28) against the outer mould (27) and cooling the outer mould (27).

8 Claims, 3 Drawing Sheets

METHOD AND APPARATUS FOR PREVENTING SINK MARKS IN THE INJECTION MOULDING OF THERMOPLASTIC POLYMERS

BACKGROUND OF THE INVENTION

1. Field of the Invention

The invention relates to a process for the injection moulding of thermoplastic polymers.

2. Discussion of Prior Art

In such a process, molten polymer material is injected into one or more cavities defined by separable mould parts, allowed to cool and solidify and extracted after the mould parts are separated. Thermoplastic polymers shrink on cooling and this causes sink marks apparent on the surface at regions where the article is thicker than in neighbouring regions.

Sink marks seriously detract from the appearance of moulded thermoplastic articles and efforts have been made to obviate them. One process injects high pressure air into the partly solidified melt and it is found that the air forms channels within the melt and permeates principally to relatively thick regions of the article. Here the air is locked under high pressure and exerts an outward force which inhibits external sinking as the melt cools.

A difficulty with the above described method is that air flow through the melt is restricted and often cut off at narrow regions of the melt since these usually solidify first. The method is therefore not suitable for some forms of article and in particular may not be suitable for multi-cavity moulds for moulding multiple parts since variation in air passage profile would cause inequality in part material.

An alternative method is shown in patent specification U.S. Pat. No. 3,345,687 where air under pressure is introduced between one mould surface and the semi-molten polymer of the part being moulded. This method uses low air pressure. For current commercial products and polymers very much greater air pressures would be required and the use of higher pressures introduces the difficulties that air can leak from between the part being moulded and the mould parting line and polymer can be forced back through the cavity gate point. The present invention seeks to provide an improved injection moulding process.

SUMMARY OF THE INVENTION

According to one aspect of the invention there is provided a method of injection moulding which consists in injecting molten thermoplastic polymer material into a cavity defined by separable mould parts, allowing the material to cool and solidify in a cooling phase, separating the mould parts and extracting the solidified material, wherein, during the cooling phase gas is applied under pressure via apertures in the cavity wall to form a pressurised gas layer between the cooling polymer and the cavity wall, characterised in that the gas is distributed to selected places in the cavity wall via micro-channels in the wall. Preferably the gas is air.

It is normal to make the cavity walls smooth but it is found that by roughening the walls slightly in selected areas the gas is provided with micro-channels along which it can flow to establish the required gas layer. Furthermore, the gas can be confined to the roughened regions by providing smooth boundaries, where the polymer will make a seal. In this way a very thin high-pressure gas layer can be established where desired. In practice a gas layer will be positioned to urge the solidifying polymer against the opposing wall of the cavity where sink marks would otherwise be experienced. Clearly, it is possible to apply gas where required in the mould and the invention is applicable to multi-cavity moulding as well as single cavity moulding.

According to another aspect of the invention there is provided a moulding tool for the injection moulding of thermoplastic polymer articles, the tool having at least one cavity defined by separable mould parts, gas ducts within at least one of the mould parts for introducing gas into the cavity via the cavity wall whereby where a gas layer may be introduced between the cavity wall and polymer cooling in the cavity; characterised in that in use the gas is distributed to selected places in the cavity wall via prepared surface portions which are roughened to provide micro-channels.

There are other disadvantages in conventional injection moulding techniques. For example, generally hollow thick-walled articles are formed by defining a cavity between a central core and an outer mould. In cooling, the polymer shrinks on to the core and loses thermal contact with the outer mould. Consequently, heat must be extracted via the core and because the core size is small and thermal access is restricted the cooling rate is limited. In turn this limits the cycle time of the moulding process. The present invention provides an improvement, since it is possible to arrange that the gas layer is provided between the core and the cooling polymer, thereby retaining thermal contact between the polymer and the outer mould as the polymer cools. Heat can be extracted efficiently and quickly via the outer mould instead of via the core.

BRIEF DESCRIPTION OF THE DRAWINGS

The invention will further be described with reference to the accompanying drawings, of which.

DETAILED DISCUSSION OF PREFERRED EMBODIMENTS

Figure 1:
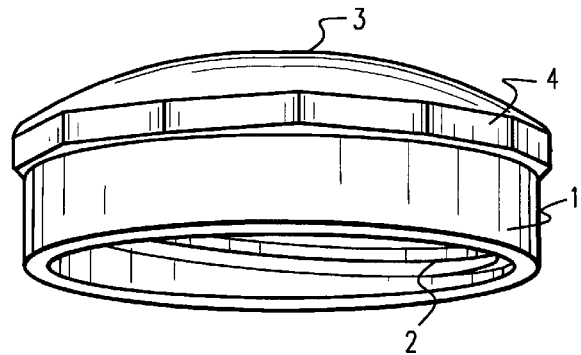
FIG. 1 is a perspective view of a thermoplastics screw top for a container.
Figure 2:
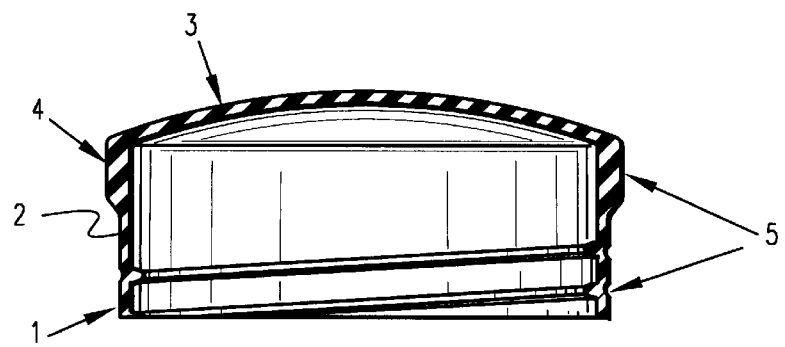
FIG. 2 is a comparative cross-sectional view of the screw top of FIG. 1.

Referring to FIG. 1 the screw top has a generally cylindrical body 1 which is internally threaded at 2 and which has a domed head 3 with flats 4 around the periphery. FIG. 2 is a comparative cross-sectional view which shows on the right-hand side the screw top when conventionally moulded and on the left-hand side the screw top when moulded using the present invention. The right-hand side shows the effect (exaggerated in the drawing) of shrinkage during cooling. Since the threaded region 2 is of alternating wall thickness there is differential shrinkage during cooling. The thicker parts shrink more than the thinner parts and since shrinking is inward the effect is to give slight depressions at 5. These are sink marks.

Figure 3:
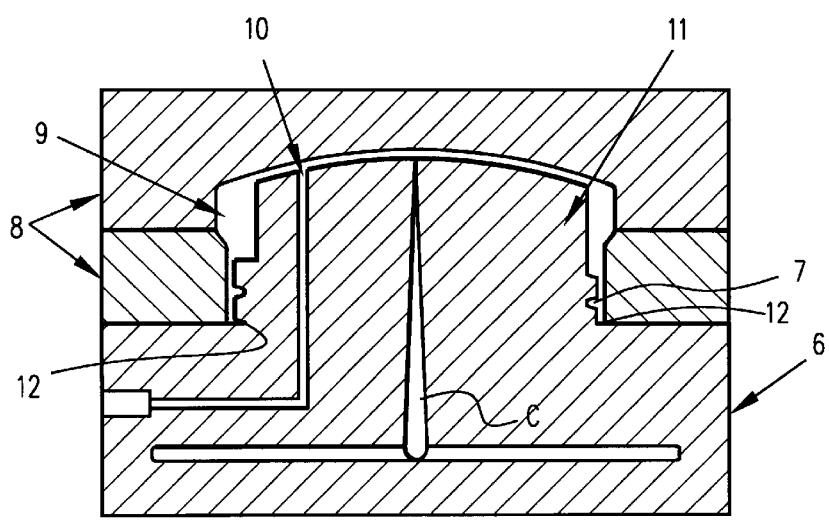
FIG. 3 is a cross-sectional view of a moulding tool embodying the invention for moulding a screw top of the kind shown in FIGS. 1 and 2.

Referring now to FIG. 3 there is shown a moulding tool embodying the invention which is designed for moulding the screw top of FIGS. 1 and 2. The tool comprises a central core 6 which has threads 7 and which defines the internal shape of the screw top. The core 6 sits within an outer split mould 8 the inner surface of which defines the external shape of the screw top. The cavity 9 defined between the core 6 and the outer mould 8 is filled with molten thermoplastic polymer via an internal central channel C by a screw injector (not shown). There is then a cooling phase during which the polymer is allowed to cool and solidify. During the cooling phase the injection pressure is held in order to pack more polymer into the tool as shrinkage takes place.

Air ducts 10 are provided in the core 6 and these are coupled by control valves (not shown) to a high pressure air supply. Typically the air pressure can be 1–300 bar. The ducts vent into the cavity at positions chosen for the desired effect of establishing a thin layer of pressurised air between the core and the cooling polymer, the air being applied during the cooling phase. The vents are less than 0.001" in width. The liquid polymer does not block such small passageways. In order to allow air to flow along the surface of the core, the core is roughened at chosen places 11 by grit blasting. The roughening provides micro-channels through which the air can permeate. Air communication to the chosen areas is ensured by situating a vent in each chosen area or by roughening the region between a vent and the chosen area to conduct air. In practice it is found beneficial to apply air in two stages, firstly a short low-pressure stage and secondly a larger high-pressure stage.

The effect of this gas-pressure is to pressurise the polymer, substantially equal to the gas pressure. In many moulded components this will cause polymer to flow back through the component "feed gate" unless prevented by either a gate valve or a machine nozzle shut-off valve. Both systems are available as proprietary injection moulding equipment.

Figure 4:
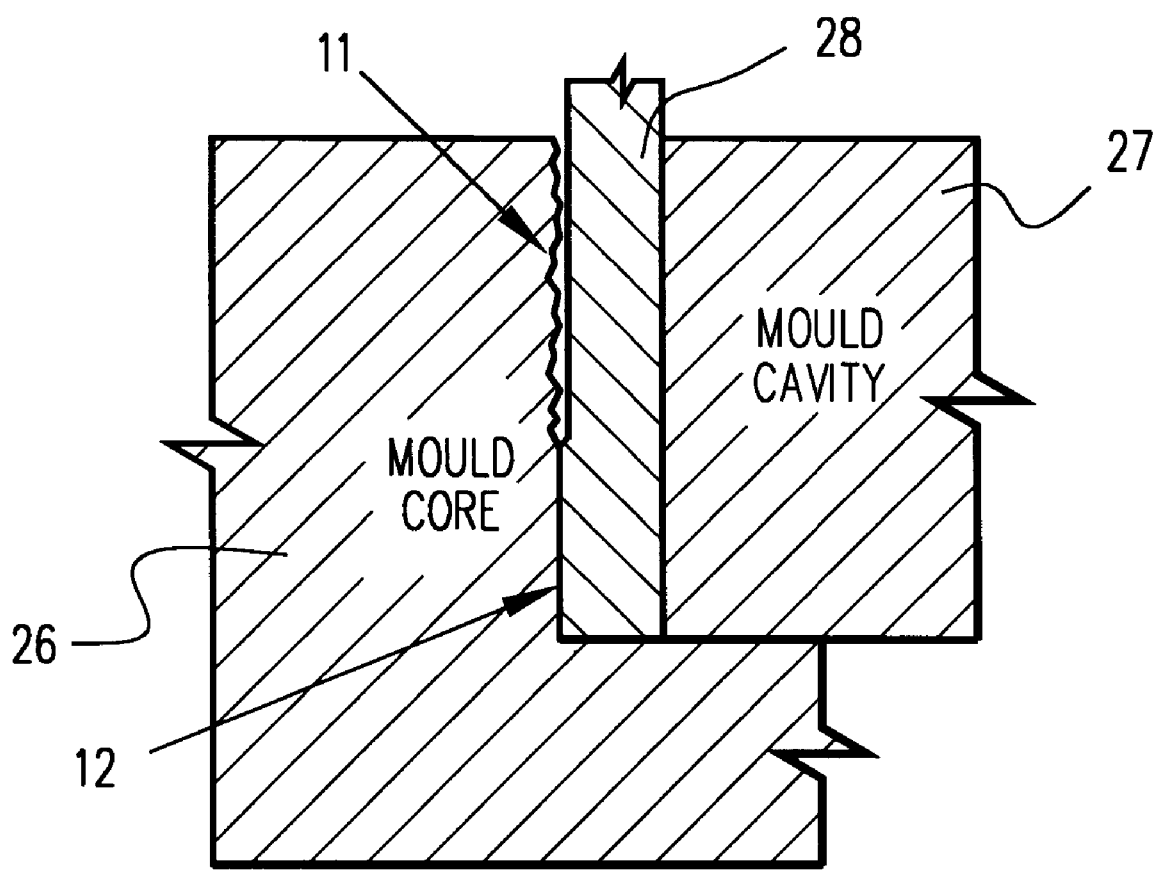
FIG. 4 is a detail view of part of the tool of FIG. 3.

FIG. 4 shows detail of the tool of FIG. 3, specifically the roughened regions 11 on the mould core (inner mould part) 26. These are surrounded by smooth boundary regions 12. At these smooth boundaries the cooling polymer forms seals which contain the pressurised air layers. The mould cavity (the outer mould part) 27 is smooth. The injected plastic is shown at 28.

The effect of the air is to urge the polymer away from the core. The amount of air and its pressure is closely regulated so that the air is just sufficient to maintain an outward pressure of the polymer against the wall of the outer mould 8 despite the tendency of the polymer to shrink. In other words the air acts as a spring which accommodates to the shrinkage effect and keeps the polymer in intimate contact with the wall of mould 8. This has two effects. Firstly, the formation of sink marks is inhibited. Secondly, cooling of the polymer takes place via the outer mould 8.

Figure 5:
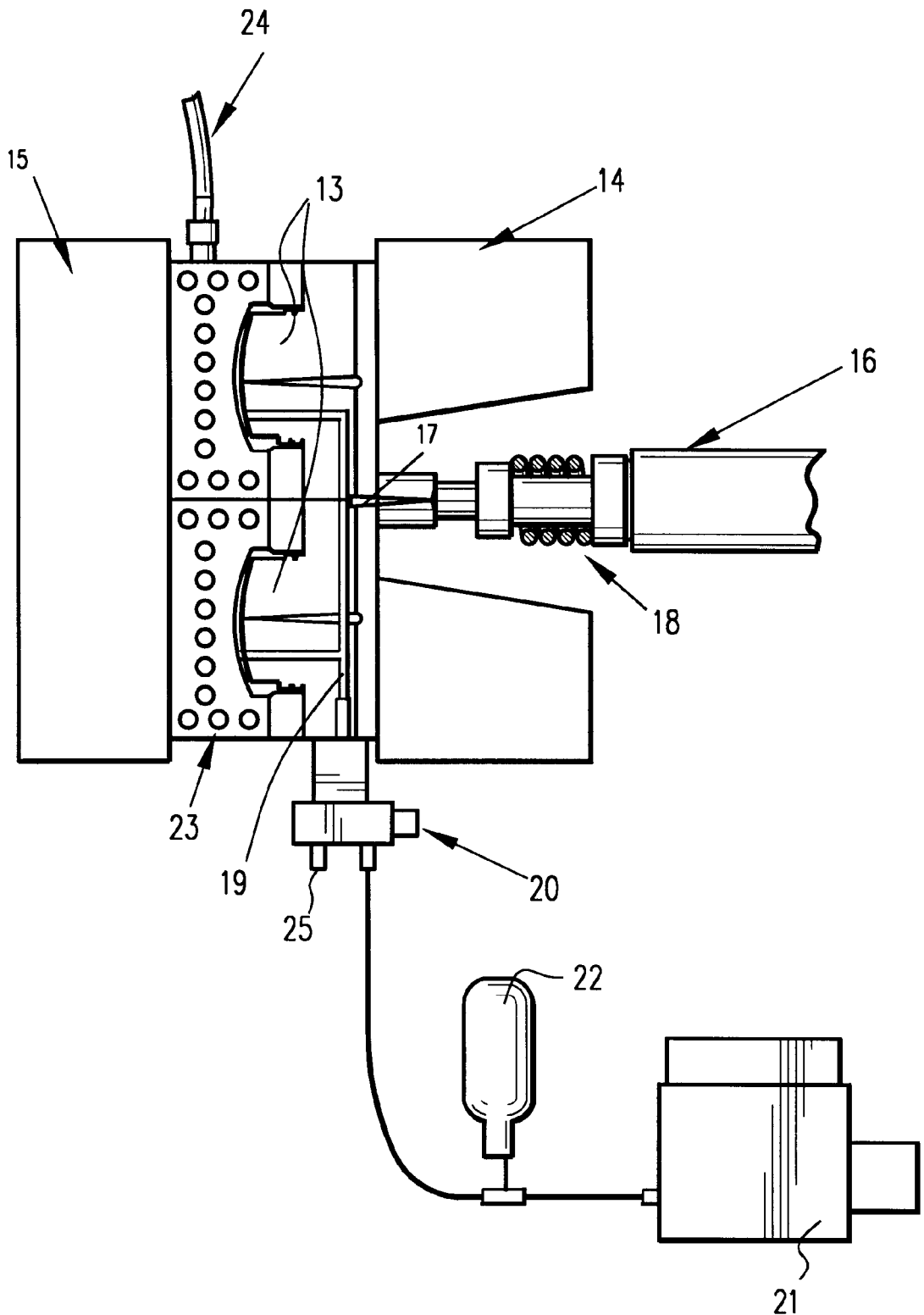
FIG. 5 is a schematic diagram of a moulding machine embodying the invention.

Referring now to FIG. 5 there is shown schematically a moulding machine which has a tool of the kind shown in FIG. 3 but with multiple mould cavities 13. The mould cavities are defined between a fixed platen 14 and a moving platen 15. A machine screw and barrel plasticising/injection system 16 is provided for injecting the plastic material at 17 via a shut-off nozzle 18.

High pressure air is supplied to the air conduit system 19 via an air solenoid valve 20 from an air compressor 21. An air reservoir 22 is provided to reduce pressure fluctuations. Valve 20 has a low air pressure input 25 which may be used for the low pressure phase described above. Accelerated cooling is achieved by means of cooling ducts 23 in the outer (moving) mould part. A pipe system 24 supplies cooling water to the ducts 23 and removes it therefrom.

Because of the more rapid cooling possible via the outer mould than conventionally via the core, improvements in cycle time may be achieved. For example, typical figures are given below for (a) conventional practice and (b) the process of the invention:

| (a) | Typical Standard Cycle. (Numbers - seconds) Overall Cycle of 16 seconds shown | | |
|---|---|---|---|
| | (i) | Material Injection | *2* |
| | (ii) | Pressure Hold | *6* |
| | (iii) | Part Cooling | 4 |
| | (iv) | Mould Open | *1 |
| | (v) | Part Ejection | *2* |
| | (vi) | Mould Close | *1 |
| | (viii) | Screw Plasticising | **8** |
| (b) | With use of the FIG. 3 tool Assuming a cycle time of 14 seconds | | |
| | (i) | Material Injection | *2* |
| | (ii) | Pressure Hold | *2* |
| | (iii) | Low Pressure Gas | *2* |
| | (iv) | High Pressure Gas | 4 |
| | (v) | Mould Open | *1 |
| | (vi) | Part Ejection | *2* |
| | (vii) | Mould Close | *1 |
| | (viii) | Screw Plasticising | ***10*** |

It has been noted that a further advantage of this moulding process is that the polymer stress above, is fundamentally equal all over the component. This is unusual with conventional moulding techniques, where it is understood that in order to minimise "sink marks", molten polymer is continuously injected into the semi-molten core of the part as it cools and shrinks away from the cavity walls. This process element is normally referred to as the "pressure hold or packing phase" and is understood to induce unequal and sometimes severe stresses into the component. These unequal internal stresses result in warpage of the part, once it is removed from the mould, and is a large element of part quality rejections. Thus any process having substantially equal stresses and low warpage will have significant economic and quality benefits.

Some of the benefits of the invention may be summarised as follows:

Product Quality

For thermoplastic mouldings, this process offers an economic route to obtaining effectively 'Sink Free' precision mouldings. Also, stresses within the parts are even and low with consequential low warpage.

Product Innovation

With innovative tooling design, parts can be manufactured with relatively simple tooling, that would be only possible, if at all, by expensive tooling running on slow cycles. Freedom in part design is allowed since requirements to hide sink marks are relaxed.

Cycle Benefits

Many injection moulding cycles are limited by the time necessary to plasticise the molten charge for the following 'shot'.

Using the invention it can be seen, that the plasticising element of the cycle can start significantly earlier in the machine cycle, giving the opportunity to shorten the cycle accordingly. In many medium to high volume parts, this cycle time saving would have a proportional effect on the part cost.

Machine Size Benefits

In many moulding systems, the size (and therefore cost) of the moulding machine is determined by the 'packing pressure' necessary to minimise 'sinks' on the part. This packing pressure tends to be relatively high, because as the part cools, it becomes progressively more difficult to inject molten material into features far away from the 'gate'.

Using the invention, however, the maximum duration required for packing is 2.0 seconds, and therefore the melt is relatively hot, and the pressure can be a minimum. Thus, it allows an increase in the size of part which can be moulded on a given sized machine with associated reduction in costs to the customer.

Cheaper Tooling

Because internal moulding stresses are reduced and there is less likelihood of the mould to flash it is possible to use less expensive tooling.

Smaller Gate Marks

Where the moulding "gate mark" is in a highly visible position, the size of this mark becomes a critical quality parameter. The gate diameter is substantially controlled by the length of the "packing phase" required, so that the gate does not freeze. However, when using this process this consideration no longer applies and the gate diameter may be the minimum necessary to fill the part.

Shrinkage Prediction

Using conventional moulding techniques it has been found to be extremely difficult to predict the precise shrinkage value for each discrete element of a part. Since this shrinkage value is influenced by the following plastic conditions during moulding:

| | |
|---|---|
| (a) | plastic temperature profile; |
| (b) | plastic stress profile; and |
| (c) | whether the element is free to shrink, or is restrained by the mould core or cavity. |

Since using this process will reduce the variation of all of these parameters it is expected that this shrinkage value will show significantly less variation, and will therefore be easier to predict.

The invention is not restricted to the details of the foregoing example.

What is claimed is:

1. A method of injection moulding which comprises:

injecting molten thermoplastic polymer material into a cavity defined by separable mould parts, said cavity having at least one wall, allowing the material to cool and solidify in a cooling phase, separating the mould parts and extracting the solidified material, wherein, during the cooling phases gas is applied under pressure via apertures in the at least one cavity wall to form a pressurised gas layer between the cooling polymer and the at least one cavity wall, wherein the gas is distributed to selected places in the at least one cavity wall via micro-channels in the wall.

2. A method as claimed in claim 1 wherein the distribution of gas via the micro-channels is limited by polymer seals formed by said polymer material at smooth-walled boundaries.

3. A method as claimed in claim 1 wherein the mould parts define a mould which is a multi-cavity mould.

4. A method as claimed in claim 1 wherein the mould parts define a mould which comprises a mould core and an outer mould and the gas layer is provided between the core and the cooling polymer, thereby retaining thermal contact between the polymer and the outer mould as the polymer cools.

5. A mould for the injection moulding of thermoplastic polymer articles, the mould comprising:

at least one cavity having at least one wall and defined by separable mould parts, gas ducts within at least one of the mould parts for introducing gas into the cavity via at least one of said at least one cavity wall, means for injecting a heated polymer material into said at least one cavity, said gas ducts comprising a means for introducing said gas layer between the at least one of said at least one cavity wall and said heated polymer material cooling in the cavity, wherein said gas ducts include roughened portions of said at least one of said at least one cavity wall for distributing the gas to selected places in the cavity wall via prepared surface portions which are roughened to provide micro-channels.

6. A moulding tool as claimed in claim 5 wherein the prepared surface portions are bounded by smooth regions.

7. A moulding tool as claimed in claim 5 wherein the tool comprises a core and an outer mould and the ducts and prepared surface portions are arranged so that the gas layer is provided between the core and the polymer.

8. A moulding tool as claimed in claim 7 wherein cooling means are provided to extract heat from the outer mould.

* * * * *